(12) United States Patent
Anonson

(10) Patent No.: US 7,007,206 B2
(45) Date of Patent: Feb. 28, 2006

(54) INTERACTIVE CIRCUIT ASSEMBLY TEST/INSPECTION SCHEDULING

(75) Inventor: Steve Anonson, Fort Collins, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 589 days.

(21) Appl. No.: 10/156,280

(22) Filed: May 28, 2002

(65) Prior Publication Data

US 2003/0226067 A1 Dec. 4, 2003

(51) Int. Cl.
*G06F 11/30* (2006.01)

(52) U.S. Cl. ........................................ 714/46; 718/102

(58) Field of Classification Search .................. 714/37, 714/46; 718/102, 103
See application file for complete search history.

(56) References Cited

U.S. PATENT DOCUMENTS

| 4,469,553 A * | 9/1984 | Whitehead ................... 216/60 |
| 5,946,663 A * | 8/1999 | Tanaka et al. ................. 705/8 |
| 2002/0143423 A1 * | 10/2002 | Huber et al. ................. 700/121 |
| 2003/0139952 A1 * | 7/2003 | Lubash et al. ................. 705/7 |
| 2004/0163241 A1 * | 8/2004 | White ......................... 29/832 |

FOREIGN PATENT DOCUMENTS

JP 11150352 A * 6/1999

* cited by examiner

*Primary Examiner*—Scott Baderman

(57) ABSTRACT

Systems and methods for scheduling circuit assemblies for inspection in an electronics manufacturing environment are provided. One embodiment comprises an interactive system for scheduling circuit assemblies for inspection. Briefly described, one such system comprises: a data structure residing in memory and comprising a plurality of data elements that define the order in which a plurality of circuit assemblies are scheduled to be inspected, each data element comprising a reference to one of the plurality of circuit assemblies; logic configured to control the manner in which the plurality of circuit assemblies are scheduled for inspection based on the data structure; and logic configured to enable a user to modify the data structure.

19 Claims, 9 Drawing Sheets

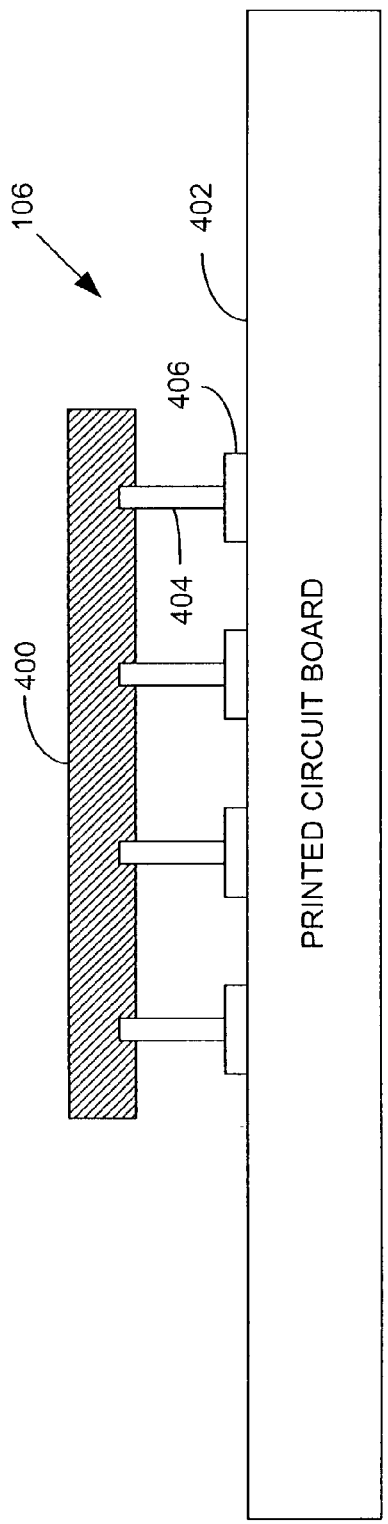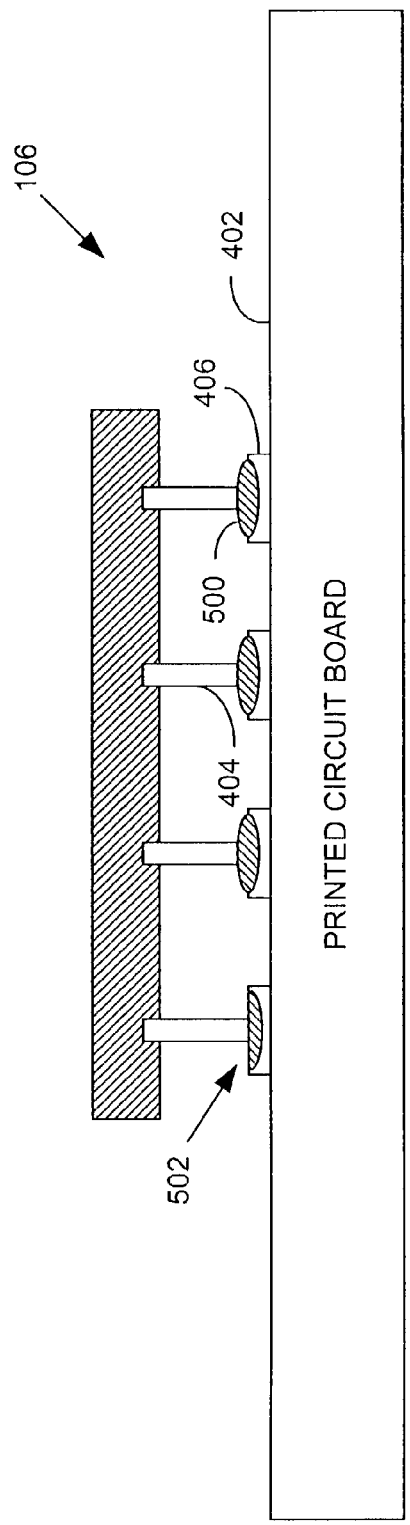

INTERACTIVE CIRCUIT ASSEMBLY TEST/INSPECTION SCHEDULING

TECHNICAL FIELD

The present invention is generally related to systems and methods for testing and/or inspecting circuit assemblies and, more particularly, is related to systems and methods for scheduling circuit assemblies to be tested and/or inspected.

BACKGROUND OF THE INVENTION

Currently, in the electronics manufacturing industry, there are a variety of automated systems and methods for testing and/or inspecting manufacturing defects in circuit assemblies (e.g., printed circuit boards, integrated circuits, etc.). For example, some circuit assembly manufacturers perform one or more of the following: automated x-ray inspection (AXI), automated optical inspection (AOI) and in-circuit testing (ICT). Regardless of the inspection/test method employed, many high-volume circuit assembly manufacturers employ a computerized system so that the operator(s) of the inspection/test system are able to provide an inspection schedule for the circuit assemblies to be processed. In this manner, the operator(s) are able to specify a particular order in which a large number of circuit assemblies will be loaded into the inspection/test system and tested. For example, an operator may generate the inspection schedule by entering a unique identification number (e.g., serial number) for the circuit assemblies to be loaded.

Although existing systems do ease the burden for an operator attempting to monitor the test/inspection process, these systems may be problematic for a number of reasons. For example, an operator may enter the circuit assembly identifiers incorrectly or in the wrong order. Furthermore, after the circuit assembly identifiers are entered, the order of the circuit assemblies waiting to be inspected may be altered or circuit assemblies may be removed. In these instances, the circuit assembly identifiers entered into the computerized system would be out of sync. This situation could potentially cause products to be untested and/or tested with an incorrect identifier. For instance, if the incorrect identifier is used when testing, a good assembly may be incorrectly repaired or a bad assembly could be passed on through the manufacturing line. In existing systems, when these types of situations occur, the entire inspection/testing system typically has to be halted in order to correct the problem. Furthermore, correcting these types of problems requires additional labor and equipment time.

SUMMARY OF THE INVENTION

The present invention provides systems and methods for scheduling circuit assemblies for inspection in an electronics manufacturing environment.

Briefly described, one such system comprises a data structure that resides in memory and comprises a plurality of data elements that define the order in which a plurality of circuit assemblies are scheduled to be inspected. Each data element comprises a reference to one of the plurality of circuit assemblies. The system may further comprise logic configured to control the manner in which the plurality of circuit assemblies are scheduled for inspection based on the data structure and logic configured to enable a user to modify the data structure.

One such method for scheduling circuit assemblies for inspection comprises the steps of: providing a computerized queue that defines the order in which a plurality of circuit assemblies are scheduled to be loaded for inspection; scheduling the plurality of circuit assemblies in the computerized queue; initiating the inspection process to begin loading the plurality of circuit assemblies based on the computerized queue; and during the inspection process, modifying the order in which the plurality of circuit assemblies are scheduled to be loaded for inspection by modifying the computerized queue.

The present invention may also be viewed as providing computer programs embodied in computer-readable media for scheduling circuit assemblies to be loaded for inspection in an electronics manufacturing environment. Briefly described, one such computer program comprises a data structure comprising a plurality of data elements that define the order in which a plurality of circuit assemblies are scheduled to be inspected. Each data element comprises a reference to one of the plurality of circuit assemblies. The computer program may further comprise logic configured to control the manner in which the plurality of circuit assemblies are scheduled for inspection based on the data structure and logic configured to enable a user to modify the data structure.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 4 is a block diagram illustrating an exemplary circuit assembly that may be inspected by the circuit inspection/testing system of FIGS. 1 and 2.

FIG. 5 is a block diagram illustrating an exemplary circuit assembly that may be inspected by the system of FIGS. 1 and 2, and which has a manufacturing defect.

DETAILED DESCRIPTION

Figure 1:
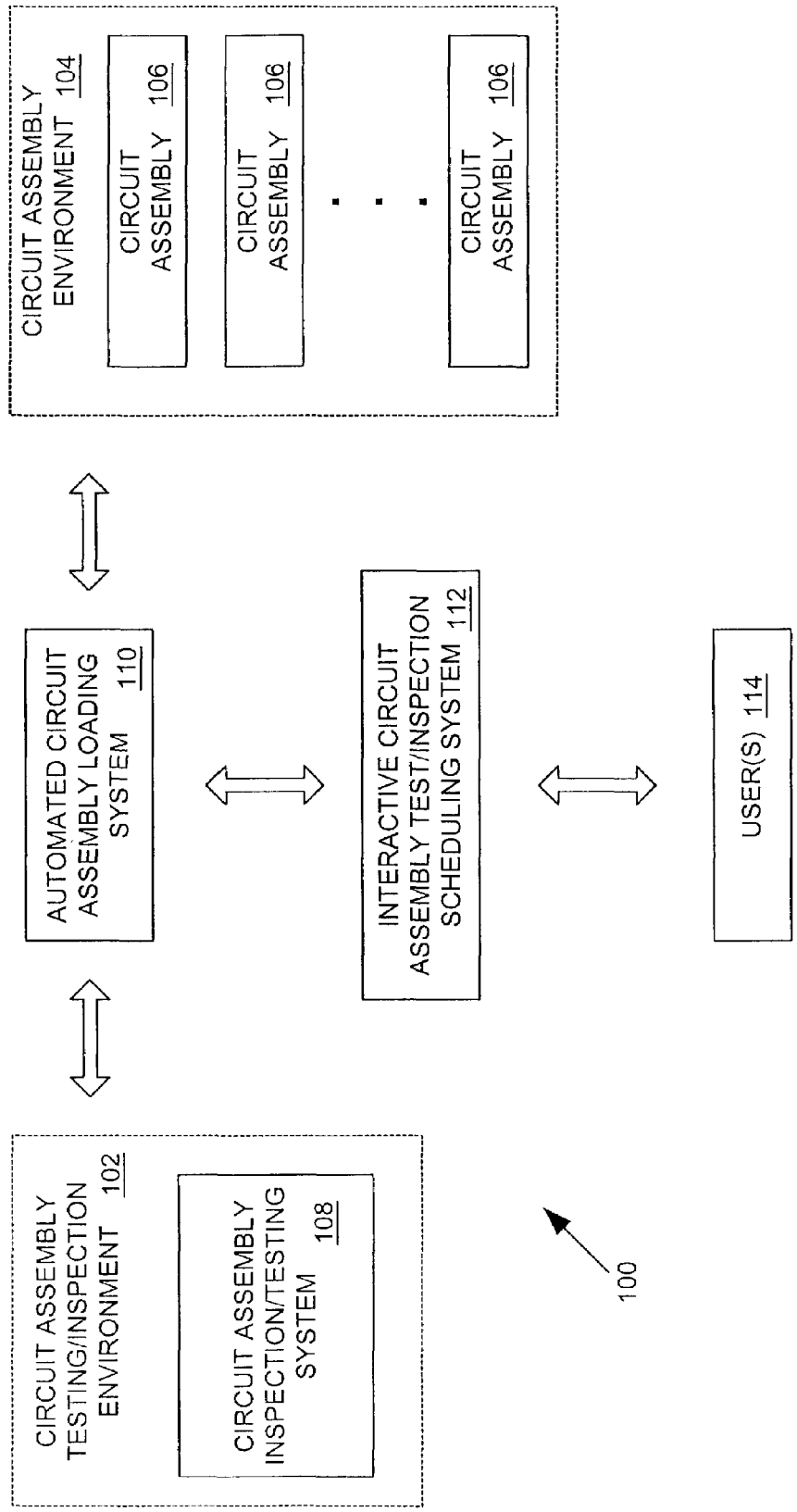
FIG. 1 is a block diagram of an electronics manufacturing environment in which an embodiment of an interactive circuit assembly test/inspection scheduling system according to the present invention may be implemented.

FIG. 1 is a block diagram of an electronics manufacturing environment 100 in which an embodiment of an interactive circuit assembly test/inspection scheduling 112 system according to the present invention may be implemented. In general, electronics manufacturing environment 100 includes the systems and methods for producing circuit assemblies 106. One of ordinary skill in the art will appreciate that circuit assemblies 106 may comprise any of a variety of electronic devices. For example, a circuit assembly 106 may comprise a printed circuit board (PCB), integrated circuit, etc., as well as other types of circuit assemblies. A circuit assembly may be any combination of electrical and/or electronic components and the electrical conductors that connect those components. The resulting combination is manufactured to form a physical and/or functional unit.

As illustrated in FIG. 1, electronics manufacturing environment 100 includes a variety of systems and methods for manufacturing circuit assemblies 106 (referred to as circuit assembly environment 104), as well as a variety of systems and methods for testing and/or inspecting circuit assemblies (106) for manufacturing defects (referred to as circuit assembly testing/inspection environment 102). As illustrated in FIG. 1, electronics manufacturing environment 100 also comprises an interactive circuit assembly test/inspection scheduling system 112 and an automated circuit assembly loading system 110, which may be used by user(s) 114 to schedule and load circuit assemblies 106 to be inspected, tested, etc. by circuit assembly inspection/testing system 108.

Referring again to FIG. 1, some of the various systems and components of electrical manufacturing environment 100 will be described in more detail. As mentioned above, automated circuit assembly loading system 110 comprises a system configured to physically transport circuit assemblies 106 from one area to circuit assembly inspection/testing system 108, where the transported circuit assembly 106 may be inspected, tested, etc. In one embodiment, automated circuit assembly loading system 110 may comprise a conveyor on which an operator places a predetermined number of circuit assemblies to be tested in the order they are to be tested. The conveyor then feeds the circuit assemblies one at a time into inspection/testing system 108. Therefore, one of ordinary skill in the art will understand that automated circuit assembly loading system 110 comprises the structures, mechanical components, etc. necessary to retrieve circuit assemblies 106, transport them, and place them within circuit assembly inspection/testing system 108. Furthermore, it will be understood that the functionality of interactive circuit assembly test/inspection scheduling system 112 may be implemented within automated circuit assembly loading system 110, as a stand-alone system, within another computing system, etc.

Figure 3:
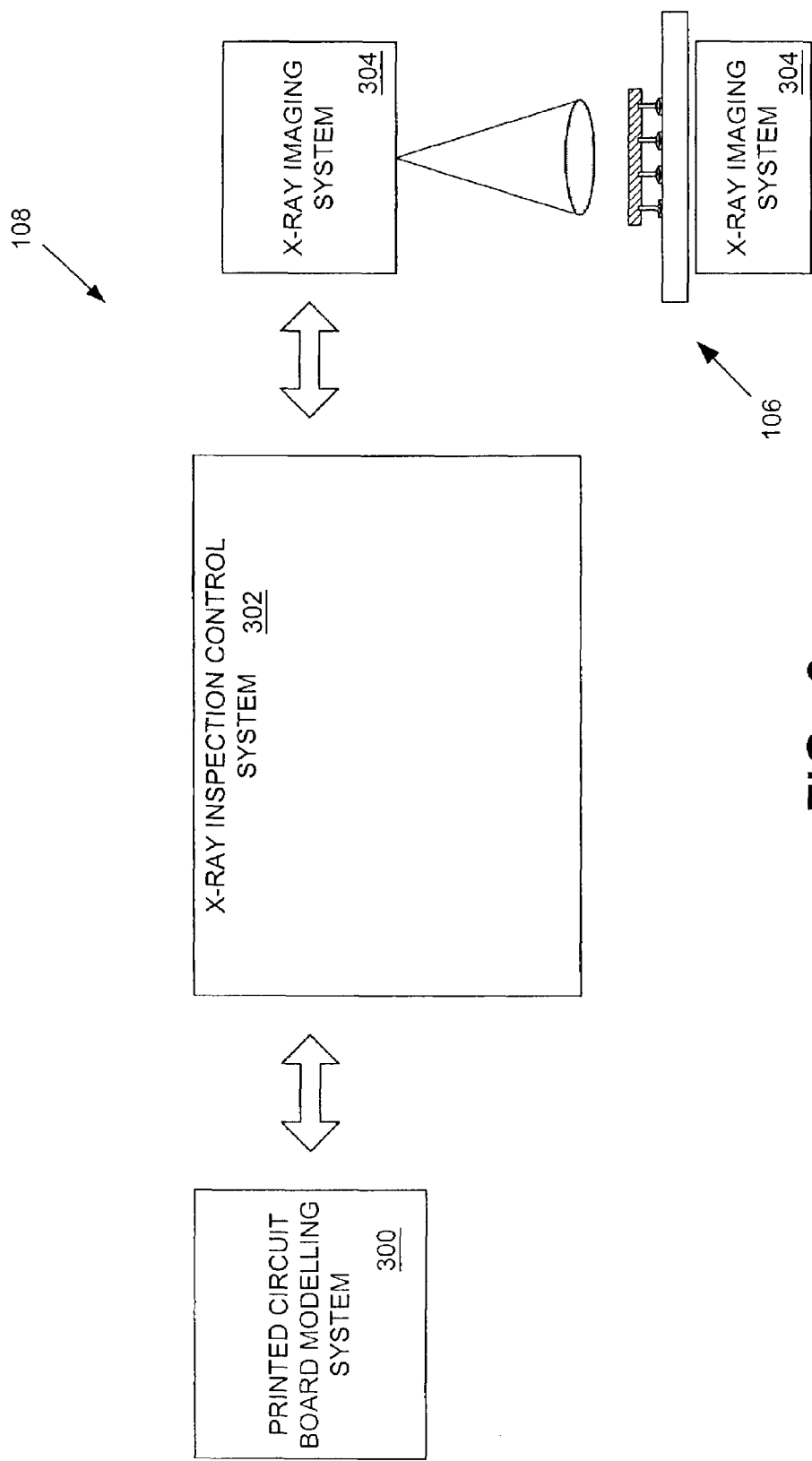
FIG. 3 is a block diagram of an exemplary circuit assembly inspection/testing system of FIG. 1.

One of ordinary skill in the art will further understand that circuit assembly inspection/testing system 108 may also be configured in a variety of ways depending on the particular type of testing and/or inspection process being performed and/or the type of circuit assembly 106. As illustrated in FIG. 3, one exemplary embodiment of circuit assembly inspection/testing system 108 comprises a printed circuit board modeling system 300, an x-ray inspection control system 302, an x-ray imaging system 304, and a circuit assembly 106 (e.g., a printed circuit board). In general, PCB modeling system 300 is a system for generating a computer model of a printed circuit board. PCB modeling system 300 may be any known or later developed computer-aided design (CAD) system capable of modeling printed circuit boards.

FIGS. 4 and 5 illustrate cross-sectional diagrams of a printed circuit board that may be modeled using PCB modeling system 300 and inspected using x-ray imaging system 304. As illustrated in FIG. 4, the printed circuit board may comprise a component 400 having one or more pins 404. Component 400 may comprise any type of electrical component for which it is desirable to solder to a PCB substrate 402. PCB substrate 402 includes an underlying integrated circuit (IC) that comprises a plurality of termination points 406, which may be soldered to the pins 404 during the manufacturing process.

As illustrated in FIG. 5, during the manufacturing process, component 400 may be electrically connected to the termination points 406 on the PCB substrate 402 via a soldering material 500. FIG. 5 illustrates the printed circuit board after the soldering process. By way of example, during the manufacturing process a variety of defects may result. For instance, in FIG. 5, the left-most pin may have a soldering defect (represented by reference numeral 502). One of ordinary skill in the art will understand that any of the following, or other, defects may occur during the manufacturing process: open solder joints, shorts, missing components, misaligned components, insufficient solder joints, excess solder joints, reversed capacitors, solder balls, solder voids, etc.

Referring to FIG. 3, x-ray imaging system 304 comprises imaging hardware and/or software for capturing an x-ray image of a manufactured printed circuit board. One of ordinary skill in the art will understand that circuit assembly inspection/testing system 108 may employ any of a variety of other types of imaging techniques (e.g., optical, ultrasonic, thermal image, etc.). X-ray inspection control system 302 interfaces with PCB modeling system 300 and x-ray imaging system 304. For instance, x-ray inspection control system 302 may receive a file containing a computer model of a particular printed circuit board from PCB modeling system 300. Based on the computer model, x-ray inspection control system 302 generates an inspection program to be implemented by x-ray imaging system 304. The inspection program may be used to image a manufactured printed circuit board, which is based on the computer model generated by PCB modeling system 300. After generating images of the manufactured printed circuit board, the images may be compared to the computer model to inspect for a variety of manufacturing defects (e.g., open solder joints, shorts, missing components, misaligned components, insufficient solder joints, excess solder joints, reversed capacitors, solder balls, solder voids, etc).

Furthermore, one of ordinary skill in the art will understand that circuit assembly inspection/testing system 108 may be configured to perform any of a variety of inspection and/or testing processes. For instance, circuit assembly inspection/testing system 108 may be configured to perform automated optical inspections, automated x-ray inspections (as in the example of FIGS. 3–4), in-circuit tests, etc.

Figure 2:
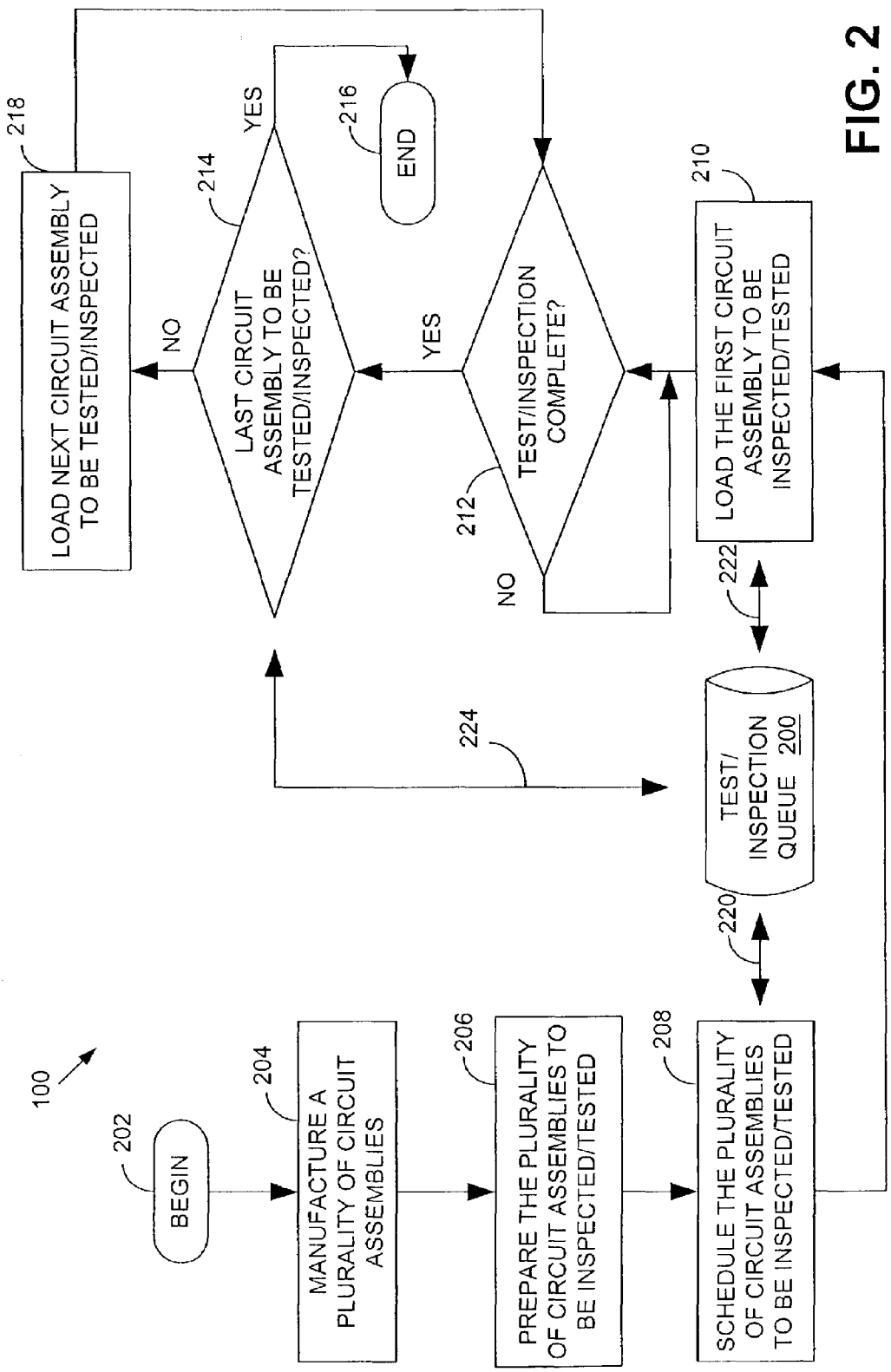
FIG. 2 is a flow chart illustrating the general operation of the electronics manufacturing environment of FIG. 1.

Referring to FIG. 2, the general operation of electrical manufacturing environment 100 and the interaction between the various components will be described with respect to an exemplary process. The process begins at block 202. At block 204, a plurality of circuit assemblies 106 are manufactured within environment 104. As known in the art, after the circuit assemblies 106 are manufactured, assembled, etc., it may be advantageous to inspect and/or test the circuit assemblies 106 in order to minimize the risk of shipping defective products to consumers. Therefore, at block 206, the circuit assemblies 106 may be prepared for test, inspection, etc. via circuit assembly inspection/testing system 108. During this process, circuit assemblies 106 may be transported to an area near circuit assembly inspection/testing system 108. Circuit assemblies 106 may also be arranged in a convenient manner (e.g., stacked in racks, etc.) so that they may be more easily loaded into circuit assembly inspection/testing system 108 (via automated circuit assembly loading system 110).

One of ordinary skill in the art will understand that, within electronics manufacturing environment 100, a large number of circuit assemblies 106 may be tested and/or inspected at the same time. Therefore, it may be advantageous to employ more than one circuit assembly inspection/testing system 108. Thus, user(s) 114 (e.g., operators performing and/or monitoring the testing/inspection process) may be required to perform many tasks simultaneously or monitor several circuit assembly inspection/testing systems 108 at the same time.

As shown at block 208, in order to ease this burden or for other purposes, user(s) 114 may employ interactive circuit assembly test/inspection scheduling system 112 to schedule the manner in which various circuit assemblies 106 are to be loaded into circuit assembly inspection/testing system 108 for testing. The scheduling process may be performed in a variety of ways. For example, each circuit assembly 106 may be associated with a unique reference designator (e.g., serial number, etc.). In one embodiment, during the scheduling process, a user 114 may specify the loading sequence by entering the serial numbers corresponding to the circuit assemblies 106 into a computer system. For example, the computer system may be configured to manage a data structure (e.g., a queue 200, a stack, database, etc.) that defines the order in which the circuit assemblies are to be loaded. As illustrated by interface 220 and described in more detail below, interactive circuit assembly test/inspection scheduling system 112 may be configured to enable user(s) 114 to modify the data structure in real-time during the testing/inspection process. In this manner, interactive circuit assembly test/inspection scheduling system 112 provides an interactive mechanism with which user(s) 114 are able to control and modify which circuit assemblies 106 are to be loaded in real-time during the test/inspection process.

After the circuit assemblies 106 are scheduled for loading into circuit assembly inspection/testing system 108, the inspection/testing process may be initiated. For instance, at block 210, the first circuit assembly 106 specified in the data structure (e.g., queue 200) may be loaded. As illustrated by decision blocks 212 and 214 and block 218, circuit assemblies 106 are loaded and tested until the final circuit assembly 106 specified in the data structure is completed. The process terminates at block 216.

Figure 6:
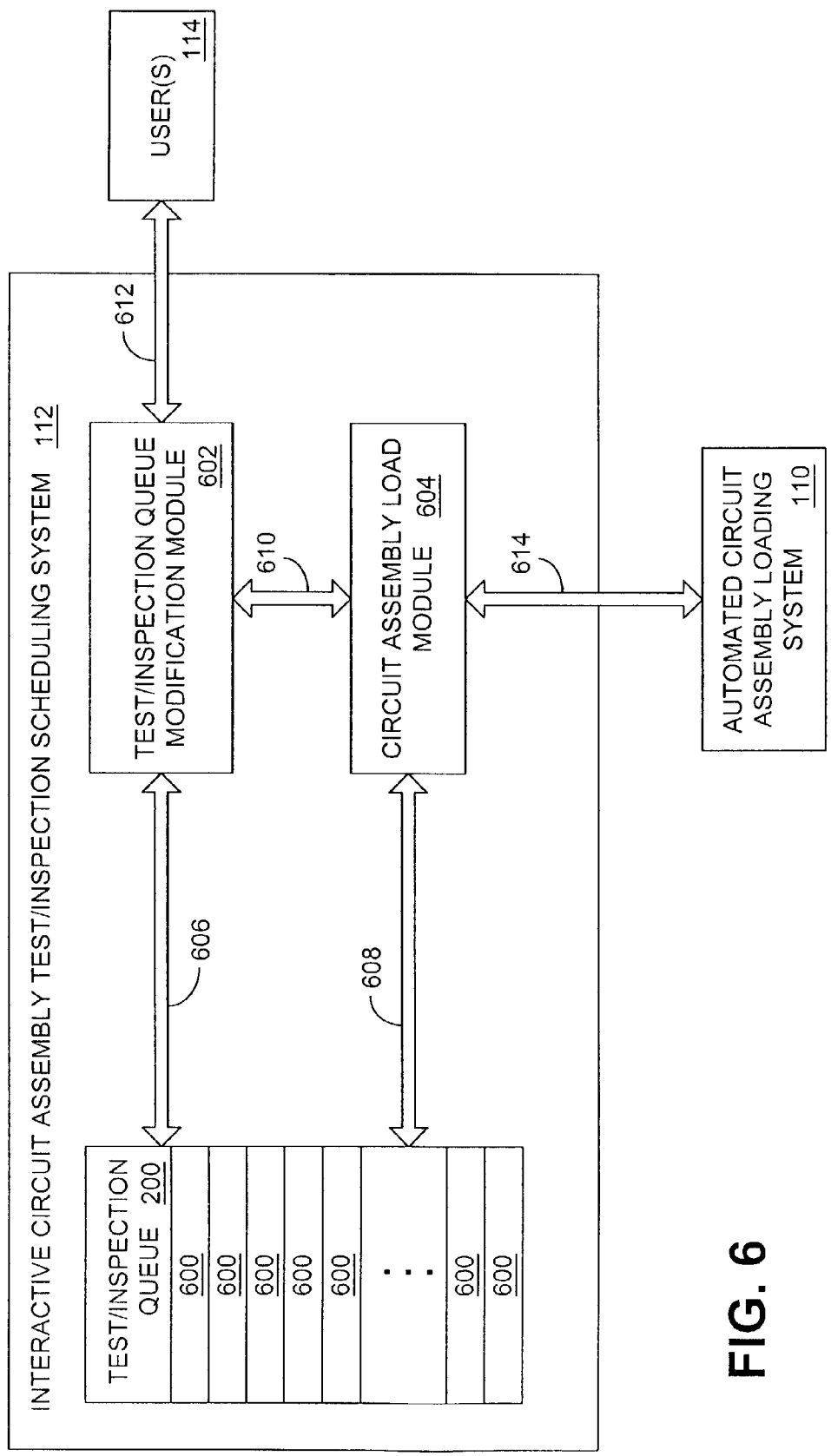
FIG. 6 is a block diagram illustrating an embodiment of the interactive circuit assembly test/inspection scheduling system of FIG. 1.

Referring to FIG. 6, an embodiment of interactive circuit assembly test/inspection scheduling system 112 will be described. As mentioned above, interactive circuit assembly test/inspection scheduling system 112 interfaces with user(s) 114 (via interface 612) and automated circuit assembly loading system 110 (via interface 614) to provide an interactive, real-time mechanism which enables user(s) 114 to modify the manner in which circuit assemblies 106 are loaded for testing/inspection. In the embodiment illustrated in FIG. 6, interactive circuit assembly test/inspection scheduling system 112 comprises a data structure (e.g., test/inspection queue 200), a test/inspection queue modification module 602, and a circuit assembly load module 604.

The data structure comprises a plurality of data elements 600 that define the order in which circuit assemblies 106 are scheduled to be loaded into circuit assembly inspection/testing system 108. For example, each data element 600 may comprise a unique reference to one of the circuit assemblies 106. In one embodiment, the unique reference comprises a serial number associated with a corresponding circuit assembly. One of ordinary skill in the art will further understand that the data structure may be configured in a variety of ways. For example, the data structure may be configured as a first-in-first-out (FIFO) queue, a last-in-first-out (LIFO) stack, etc., or in any other manner such that a relationship between the data elements 600 defines the sequence in which the circuit assemblies 106 are to be loaded (e.g., by a reference pointer, etc.).

As further illustrated in FIG. 6, the data structure may be accessed by test/inspection queue modification module 602 (via interface 606) and by circuit assembly load module 604 (via interface 608). Modules 602 and 604 may communicate via interface 610.

Figure 7:
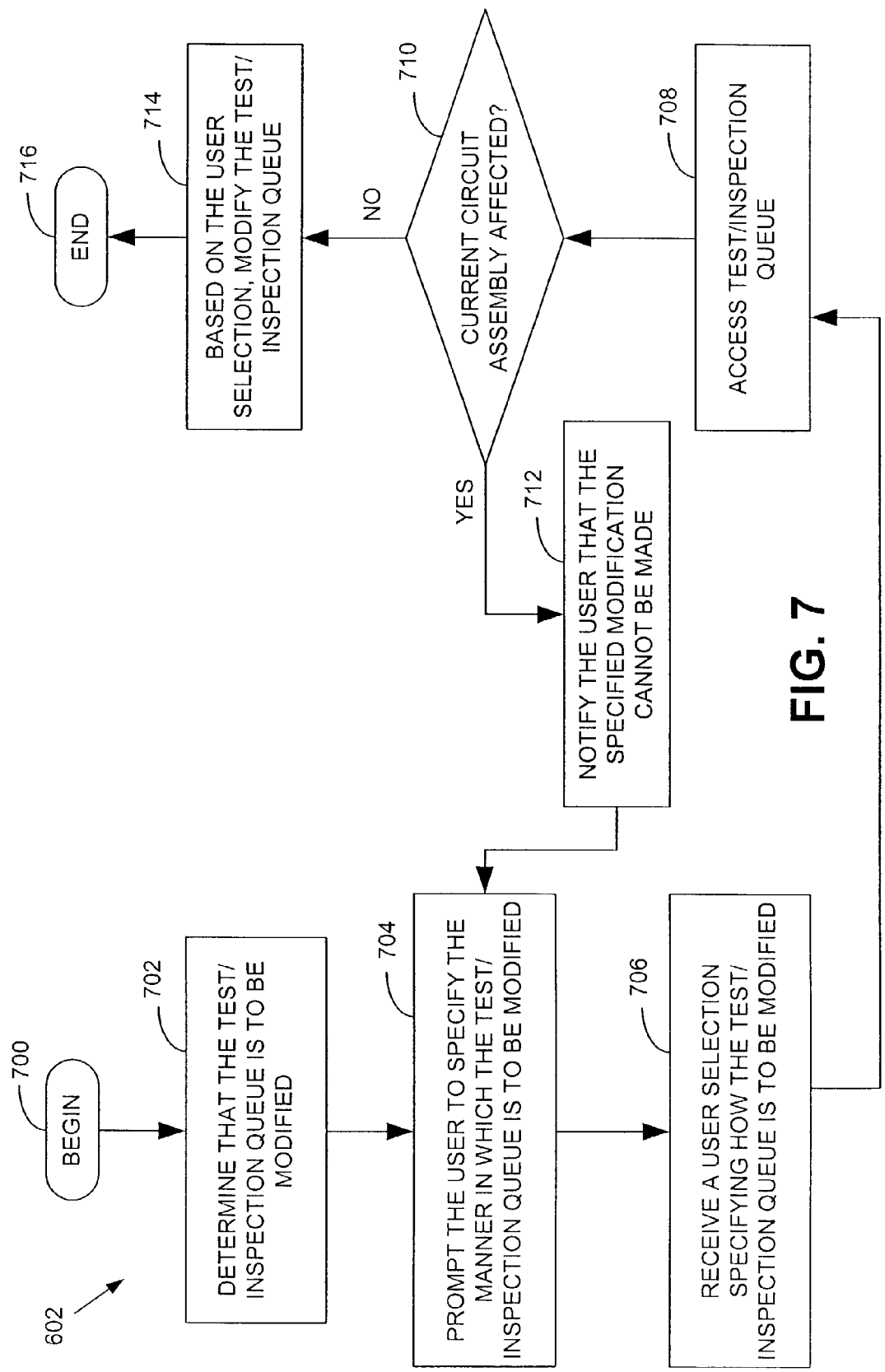
FIG. 7 is a flow chart illustrating the general functionality, architecture, and/or operation of the test/inspection queue modification module of FIG. 6.

Referring to FIG. 7, the general architecture, operation, and/or functionality of an embodiment of test/inspection queue modification module 602 will be described. As stated above generally, test/inspection queue modification module 602 enables user(s) 114 to modify the contents of the queue 200 in real-time during the test/inspection process. In this manner, user(s) 114 may remove a reference to a circuit assembly 106 from the queue 200, rearrange the order of the circuit assemblies, etc. Test/inspection queue modification module 602 may be initiated at block 700. Test/inspection queue modification module 602 may be initiated the first time a user 114 defines the contents of the data elements. In addition, it should be noted that test/inspection queue modification module 602 may also be active throughout the inspection process so that user(s) 114 (and other system(s)) may continue to modify the queue in real-time during the inspection process.

At block 702, test/inspection queue modification module 602 determines that the data structure (e.g., queue 200) is to be modified. One of ordinary skill in the art will understand that there may be a variety of conditions for determining when the queue 200 is to be modified. For example, test/inspection queue modification module 602 may be configured such that a user 114 may notify the system when the queue is to be modified. Under other conditions, the decision to modify the queue 200 may be controlled by automated circuit assembly loading system 110, circuit assembly inspection/testing system 108, or some other external system.

Regardless of the triggering condition, at block 704, test/inspection queue modification module 602 may prompt the user to specify the manner in which the data structure is to be modified. At block 706, test/inspection queue modification module 602 receives a user selection specifying the manner in which the data structure is to be modified. As mentioned above briefly, test/inspection queue modification module 602 may be configured to enable a user 114 to perform a variety of functions. For example, test/inspection queue modification module 602 may be configured to enable a user 114 to perform any of the following, or other functions: delete a circuit assembly 106; rearrange the order in which the circuit assemblies 106 are to be loaded; modify the serial number for a particular circuit assembly 106, etc.

After the user selection is received, at block 708, test/inspection queue modification module 602 may access the data structure.

As illustrated by decision block 710, test/inspection queue modification module 602 may also be configured with a feature which prevents the user 114 from modifying the queue 200 if the requested modification would affect the current circuit assembly 106 being inspected. In these instances, at block 712, test/inspection queue modification module 602 may notify the user 114 that the specified modification cannot be made to the queue 200. If the requested modification does not affect the current circuit assembly 106 being inspected, at block 714, test/inspection queue modification module 602 may modify the queue 200 in accordance with the requested modification. The process terminates at block 716.

Figure 8:
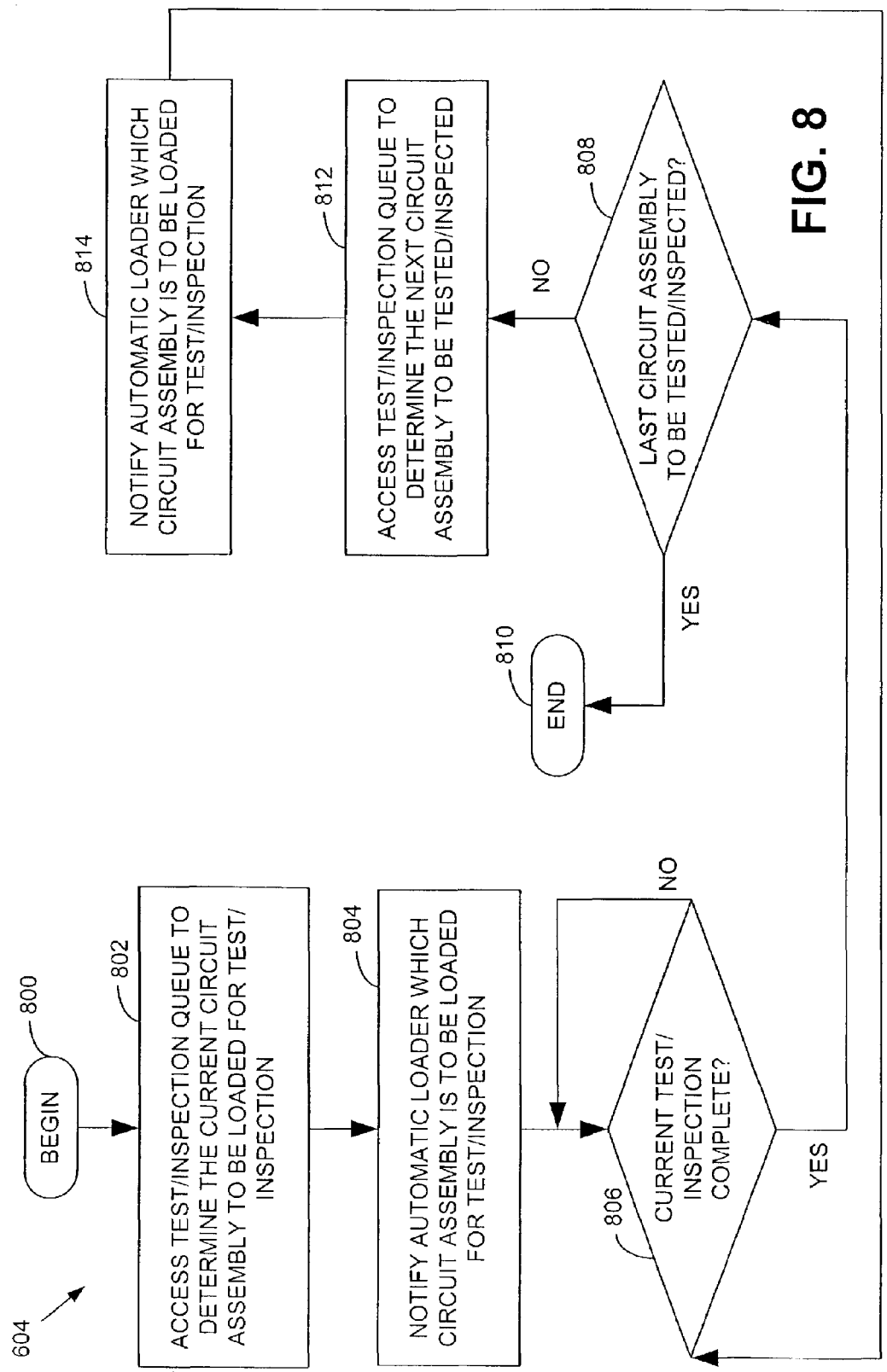
FIG. 8 is a flow chart illustrating the general functionality, architecture, and/or operation of the circuit assembly load module of FIG. 6.

Referring to FIG. 8, the general architecture, operation, and/or functionality of an embodiment of circuit assembly load module 604 will be described. In general, circuit assembly load module 604 comprises the mechanism for accessing the queue 200, determining which circuit assembly 106 is to be loaded next (based on the order defined by the queue 200), and notifying automatic circuit assembly loading system 110 which circuit assembly to load.

As illustrated in FIG. 8, circuit assembly load module 604 may be initiated at block 800. At block 802, circuit assembly load module 604 accesses the data structure (e.g., queue 200) to determine the current assembly to be loaded for inspection. As stated above, data elements 600 in queue 200 may contain unique references for a corresponding circuit assembly 106. At block 804, circuit assembly load module 604 notifies automated circuit assembly loading system 110 which circuit assembly 106 is to be loaded for inspection. This may be accomplished by forwarding the unique reference number (e.g., serial number) associated with one of the circuit assemblies 106. At decision block 806, circuit assembly load module 604 determines when the inspection for the current circuit assembly 106 is complete and the next circuit assembly 106 is to be loaded for inspection. When the current inspection is complete, at decision block 808, circuit assembly load module 604 determines whether the current circuit assembly 106 is the last to be inspected. If it is, circuit assembly load module 604 terminates at block 810.

However, if there are still circuit assemblies 106 referenced in the queue 200, at block 812, circuit assembly load module 604 accesses queue 200 to determine the next circuit assembly 106 to be inspected. At block 814, circuit assembly load module 604 notifies automated circuit assembly loading system 110 which circuit assembly 106 is to be loaded. This process may be repeated at decision block 806 until all of the circuit assemblies 106 are inspected.

It should be noted that test/inspection queue modification module 602 and circuit assembly load module 604 may be viewed as independent processes. In other words, both modules are configured to simultaneously interface with queue 200. In this manner, as described above, a user 114 may modify the contents of queue 200 in real-time during the inspection process.

Figure 9:
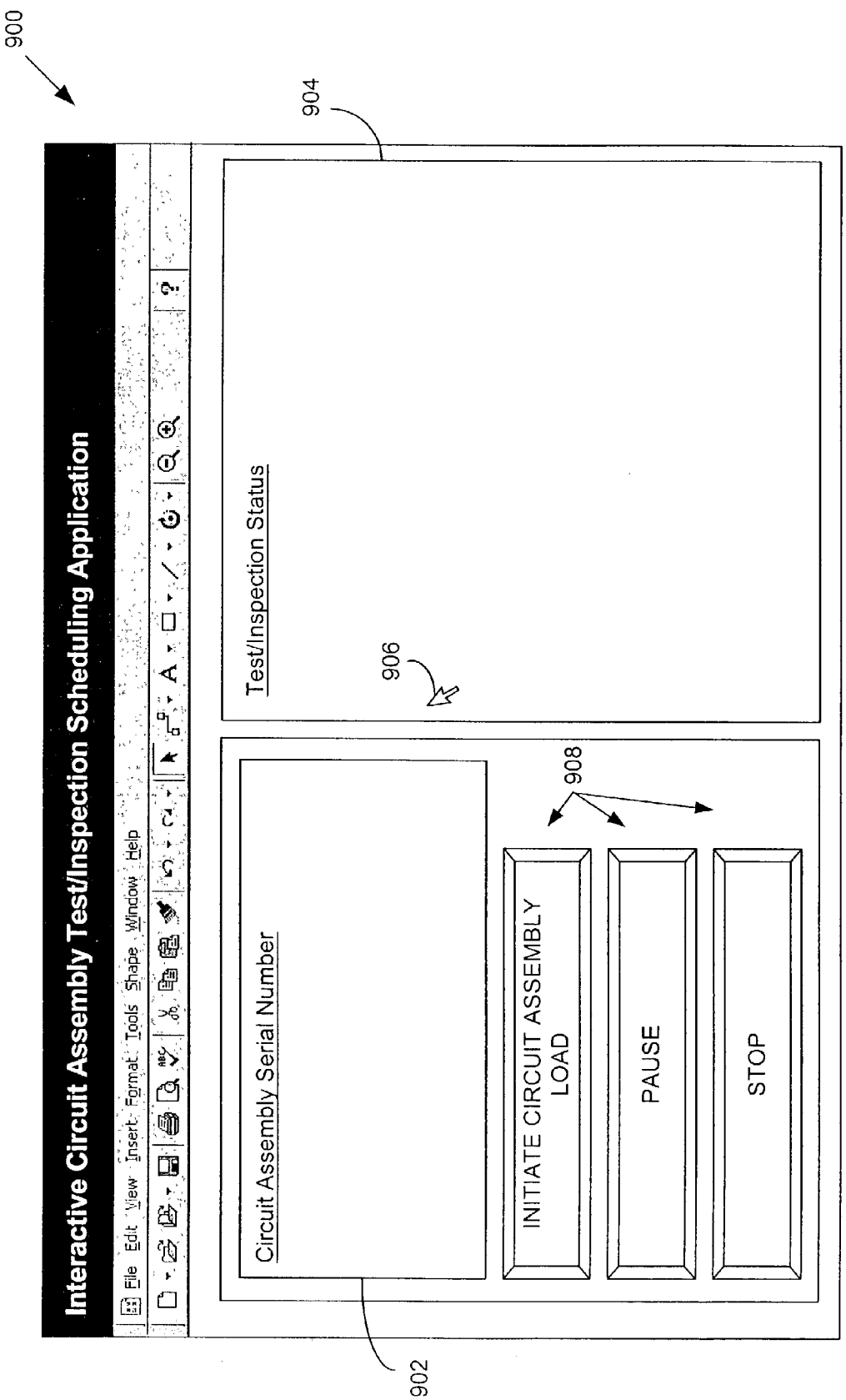
FIG. 9 is a screen shot of an embodiment of a graphical user interface that may be implemented by the interactive circuit assembly test/inspection scheduling system of FIGS. 1 and 6.

As mentioned above, interactive circuit assembly test/inspection scheduling system 112 interfaces with user(s) 114 via interface 612. One of ordinary skill in the art will understand that interface 612 may be configured in a variety of ways. For example, in one embodiment, interface 612 comprises a graphical user interface. In this regard, FIG. 9 is a screen shot 900 of an embodiment of a graphical user interface that may be implemented by interactive circuit assembly test/inspection scheduling system 112 for interfacing with user(s) 114. As illustrated in FIG. 9, the graphical user interface may support a first window 902 in which a user 114 may populate queue 200 by entering unique reference designators (e.g., serial numbers) for the corresponding circuit assemblies 106. Once the unique reference designators are input into window 902, a user 114 may interact with the entries, for example, by selecting them via cursor 906. As further illustrated in FIG. 9, the graphical user interface may also provide one or more virtual buttons 908 configured to provide a particular functionality. For example, one button may be configured to initiate the inspection process, and other buttons may be configured to pause and/or stop the inspection process. One of ordinary skill in the art will understand that any of a variety of other functions may be support by the graphical user interface. For example, as illustrated in FIG. 9, the graphical user interface may also provide another window 904, which displays the current status of the inspection process.

Figure 10:
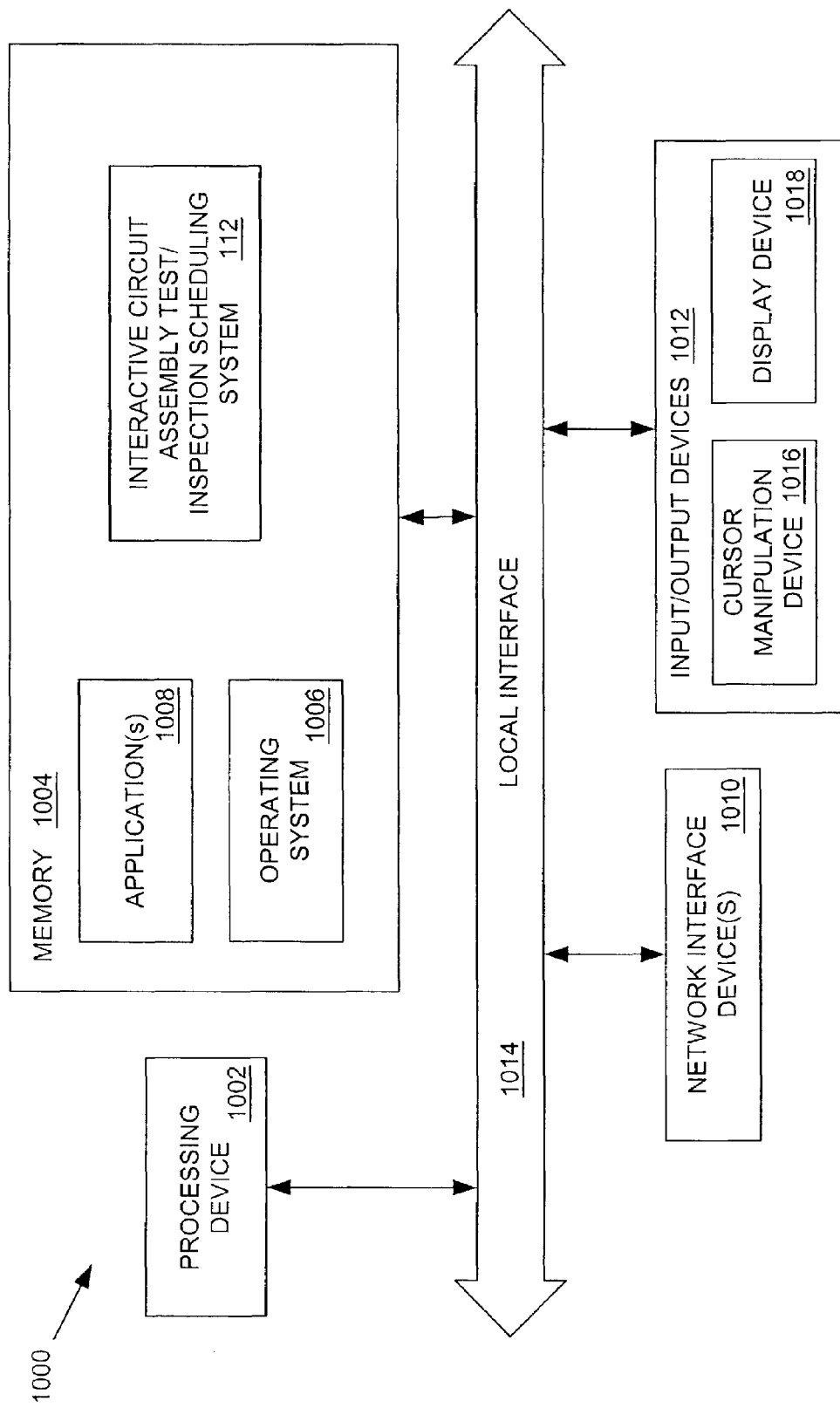
FIG. 10 is a block diagram of an exemplary computing system that may be used to implement the interactive circuit assembly test/inspection scheduling system of FIGS. 1 and 6.

FIG. 10 is a block diagram of an exemplary computing system 1000 that may be used to implement interactive circuit assembly test/inspection scheduling system 112. It should be noted that interactive circuit assembly test/inspection scheduling system 112 may be implemented in software, firmware, hardware, or a combination thereof. In the embodiment illustrated in FIG. 10, interactive circuit assembly test/inspection scheduling system 112 is implemented in software, as an executable program, which is executed by a processing device 1002. Generally, in terms of hardware architecture, as shown in FIG. 10, computing system 1000 comprises a processing device 1002, memory 1004, one or more network interface devices 1010, and one or more input and/or output (I/O) devices 1010 interconnected via a local interface 1014. Computing system 1000 may further comprise additional components not illustrated in FIG. 10.

Referring again to FIG. 10, the various components of computing system 1000 will be described. Local interface 1014 may be, for example but not limited to, one or more buses or other wired or wireless connections. The local interface 1014 may have additional elements, which are omitted for simplicity, such as controllers, buffers (caches), drivers, repeaters, and receivers, to enable communications. Furthermore, the local interface 1014 may include address, control, and/or data connections to enable appropriate communications among the aforementioned components.

Processing device 1002 is a hardware device for executing software, particularly that stored in memory 1004. Processing device 1002 may be any custom-made or commercially-available processor, a central processing unit (CPU), an auxiliary processor among several processors associated with computing system 1000, a semiconductor based microprocessor (in the form of a microchip or chip set), a macroprocessor, or generally any device for executing software instructions.

As illustrated in FIG. 10, memory 1004 may comprise an operating system 1006, one or more applications 1008, and interactive circuit assembly test/inspection scheduling system 112. Memory 1004 may include any one or combination of volatile memory elements (e.g., random access memory (RAM, such as DRAM, SRAM, SDRAM, etc.)) and non-volatile memory elements (e.g., ROM, hard drive, tape, CDROM, etc.). Memory 1004 may incorporate electronic, magnetic, optical, and/or other types of storage media. Furthermore, memory 1004 may have a distributed architecture, in which various components are situated remote from one another, but can be accessed by processing device 1002.

The software in memory 1004 may include one or more separate programs, each of which comprises executable instructions for implementing logical functions. Memory 1004 may further comprise a suitable operating system 1006 that controls the execution of other computer programs, such as one or more applications 1008 and interactive circuit assembly test/inspection scheduling system 112, and provides scheduling, input-output control, file and data management, memory management, and communication control and related services.

Interactive circuit assembly test/inspection scheduling system 112 may be a source program, executable program (object code), script, or any other entity comprising a set of instructions to be performed. When implemented as a source program, then the program needs to be translated via a compiler, assembler, interpreter, or the like, which may or may not be included within the memory 1004, so as to operate properly in connection with operating system 1006. Furthermore, interactive circuit assembly test/inspection scheduling system 112 may be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

Network interface device(s) 1010 may be any device configured to facilitate communication between computing system 1000 and a communication network, such as a public or private packet-switched or other data network including the Internet, a circuit switched network, such as the public switched telephone network, a wireless network, an optical network, or any other desired communications infrastructure.

Input/output devices 1012 may comprise any device configured to communicate with local interface 1014. One of ordinary skill in the art will understand that, depending on the configuration of computing system 1000, input/output devices 1012 may include any of the following, or other, devices: a keyboard, a mouse, display device, such a computer monitor, a serial port, a parallel port, a printer, speakers, a microphone, etc.

As illustrated in FIG. 10, computing system 1000 may include a cursor manipulation device 1016 and a display device 1018. As described in detail above, interactive circuit assembly test/inspection scheduling system 112 may work in cooperation with a graphical user interface to enable user(s) 114 modify queue 200 in real-time during the inspection of circuit assemblies 106. Accordingly, a user 114 may interact with interactive circuit assembly test/inspection scheduling system 112 via display device 1018 and cursor manipulation device 1016. Thus, one of ordinary skill in the art will appreciate that display device 1018 may comprise any of the following (or other) types of devices configured to support the graphical user interface: a computer monitor, a liquid crystal display (LCD), a plasma-based display, an LED-based display, a touch-sensitive screen, such as those implemented in portable computing devices (e.g., a personal digital assistant (PDA)), and any other known or future display device, regardless of the underlying display technology. Furthermore, cursor manipulation device 1016 may comprise any input device configured to cooperate with an application 108, operating system 106, and/or interactive circuit assembly test/inspection scheduling system 112 and manipulate a cursor 906 displayed on the display device 1018. For example, cursor manipulation device 1016 may comprise a mouse, a trackball, a set of navigation keys (e.g., arrow keys), and a joystick stick, to name a few.

During operation of computing system 1000, the processing device 1002 is configured to execute logic stored within the memory 1004, to communicate data to and from the memory 1004, and to generally control operations of the computing system 1000 pursuant to the software. Interactive circuit assembly test/inspection scheduling system 112 and operating system 1006, in whole or in part, but typically the latter, are read by the processing device 1002, perhaps buffered within the processing device 1002, and then executed.

In embodiments where interactive circuit assembly test/inspection scheduling system 112 is implemented in software, as is shown in FIG. 10, interactive circuit assembly test/inspection scheduling system 112 may be stored on any computer-readable medium for use by or in connection with any computer related system or method. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In alternative embodiments where interactive circuit assembly test/inspection scheduling system 112 is implemented in hardware, interactive circuit assembly test/inspection scheduling system 112 may be implemented with any or a combination of the following, or other, technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It should be emphasized that the above-described embodiments of interactive circuit assembly test/inspection scheduling system 112 are merely possible examples of implementations, set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and protected by the following claims.

Therefore, having thus described the invention, at least the following is claimed:

1. An interactive system for scheduling circuit assemblies for inspection, the system comprising:

a data structure residing in memory and comprising a plurality of data elements that define an order in which a plurality of circuit assemblies are scheduled to be inspected, each data element comprising a reference to one of the plurality of circuit assemblies; and logic configured:
to control the manner in which the plurality of circuit assemblies are scheduled for inspection based on the data structure; and
to enable a user to modify the data structure.

2. The interactive system of claim 1, wherein the data structure comprises a queue.

3. The interactive system of claim 1, wherein the data structure comprises a stack.

4. The interactive system of claim 1, wherein the logic comprises software; and further comprising a processing device configured to implement the logic.

5. The interactive system of claim 1, wherein the logic configured to enable a user to modify the data structure is operative to provide a graphical user interface.

6. The interactive system of claim 1, wherein the logic configured to enable a user to modify the data structure comprises logic configured to:
prompt the user to specify a manner in which the data structure is to be modified;
receive a user selection that specifies the manner in which the data structure is to be modified; and
modify the data structure based on the user selection.

7. The interactive system of claim 1, further comprising logic configured to initiate inspection of the circuit assemblies.

8. The interactive system of claim 1, further comprising a loading mechanism and a circuit assembly inspection system, wherein the loading mechanism is responsive to the logic configured to control the manner in which the plurality of circuit assemblies are scheduled for inspection and is configured to load one of the plurality of circuit assemblies into the circuit assembly inspection system to inspect circuit assemblies.

9. The interactive system of claim 8, wherein the circuit assembly inspection system comprises at least one of: an automated x-ray inspection system, an automated optical inspection system, and an in-circuit test system.

10. The interactive system of claim 8, wherein the circuit assembly inspection system is configured to inspect printed circuit boards.

11. An interactive system for scheduling circuit assemblies for inspection, the system comprising:
means for storing a data structure, the data structure comprising a plurality of data elements that define an order in which a plurality of circuit assemblies are scheduled to be inspected by a circuit assembly inspection system, each data element comprising a reference to one of the plurality of circuit assemblies;
means for controlling the manner in which the plurality of circuit assemblies are scheduled for inspection based on the data structure; and
means for interfacing with a user and enabling the user to modify the data structure.

12. The interactive system of claim 11, wherein the data structure comprises a queue.

13. A method for inspecting a plurality of circuit assemblies in an electronics manufacturing environment, the method comprising the steps of:
providing a computerized queue that defines the order in which a plurality of circuit assemblies are scheduled to be loaded for inspection;
scheduling the plurality of circuit assemblies in the computerized queue;
initiating an inspection process to begin loading the plurality of circuit assemblies based on the computerized queue; and
during the inspection process, modifying an order in which the plurality of circuit assemblies are scheduled to be loaded for inspection by modifying the computerized queue.

14. The method of claim 13, wherein the step of modifying the order in which the plurality of circuit assemblies are scheduled to be loaded for inspection comprises providing a graphical user interface for modifying the computerized queue.

15. A computer program embodied in a computer-readable storage medium for scheduling circuit assemblies to be loaded for inspection in a manufacturing environment, the computer program comprising:
a data structure comprising a plurality of data elements that define the order in which a plurality of circuit assemblies are scheduled to be inspected, each data element comprising a reference to one of the plurality of circuit assemblies;
logic configured to control the manner in which the plurality of circuit assemblies are scheduled for inspection based on the data structure; and
logic configured to enable a user to modify the data structure.

16. The computer program of claim 15, wherein the data structure comprises a queue.

17. The computer program of claim 15, wherein the logic configured to enable a user to modify the data structure comprises a graphical user interface.

18. The computer program of claim 15, wherein the logic configured to enable a user to modify the data structure comprises logic configured to:
prompt the user to specify the manner in which the data structure is to be modified;
receive a user selection that specifies the manner in which the data structure is to be modified; and
modify the data structure based on the user selection.

19. The computer program of claim 15, further comprising logic configured to initiate inspection of the circuit assemblies.

* * * * *